Nov. 15, 1955
W. H. HOGAN
2,723,847
DOUBLE ACTING LIQUID SHOCK ISOLATOR
Filed June 21, 1952
2 Sheets-Sheet 1
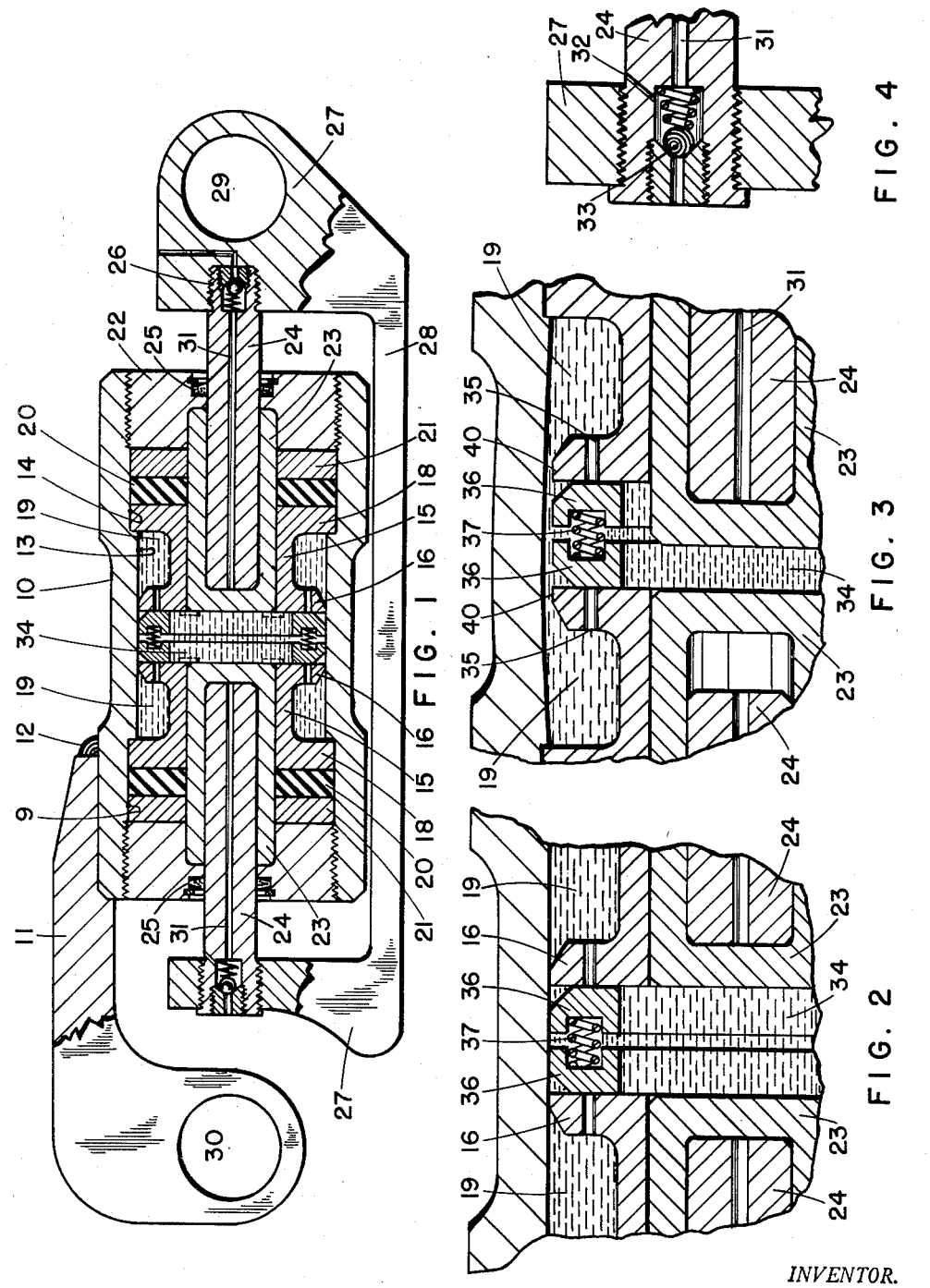
INVENTOR.
WALTER H. HOGAN
BY
ATTORNEY

INVENTOR.
WALTER H. HOGAN
BY
ATTORNEY

United States Patent Office 2,723,847
Patented Nov. 15, 1955

2,723,847
DOUBLE ACTING LIQUID SHOCK ISOLATOR

Walter H. Hogan, Lakewood, Ohio, assignor to The Cleveland Pneumatic Tool Company, Cleveland, Ohio, a corporation of Ohio Application June 21, 1952, Serial No. 294,876

10 Claims. (Cl. 267—64)

This invention relates broadly to shock absorbers, but more particularly to shock and vibrator isolators of the type embodying a cylinder having a plunger slidable therein, movement of the plunger being checked by compression of liquid stored in the cylinder.

Such devices are generally referred to as liquid springs, which heretofore have been produced to act efficiently in only one direction.

It is therefore one object of this invention to produce a double acting liquid spring of the cylinder-plunger type, in which the spring rate is the same in both directions.

Another object of this invention is to produce a double acting liquid spring arranged and constructed in a manner wherein certain parts may be of different sizes to produce a different spring rate in each direction.

Another object of this invention is to provide a double acting shock isolator of the liquid spring type equipped with a simple and efficient liquid damping means automatically effective at a rate proportional to the relative velocity between the isolated object and its support.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific constructions indicative of the scope and spirit of the invention.

In the accompanying drawings:

Figure 1 is a longitudinal view, almost entirely in section, of a unit embodying one preferred form of the invention.

Figures 2 and 3 are enlarged views of a portion of the unit shown in Figure 1, showing some of the parts in different positions.

Figure 4 is an enlarged view of one of the check valves shown in Figure 1.

Figure 5:
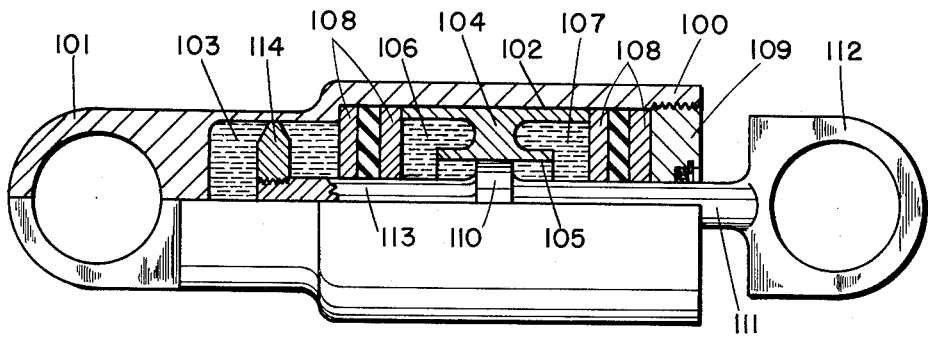
Figures 5, 6 and 7 are longitudinal views, partly in section, of units embodying modifications of the invention.

Referring to the drawings, in which like symbols designate corresponding parts throughout the several views, 10 represents a cylindrical housing having a bracket 11 rigidly secured thereto by any suitable means such as a weld 12. This housing is provided with a cylindrical chamber 13 having both ends enlarged to form counterbores 9 and 14.

Located in these two counterbores are identical mechanisms each including a sleeve 15 extending part way into the chamber 13 and having an inner annular flange 16 normally in peripheral engagement with the wall of chamber 13. The other end of the sleeve is provided with an outer annular flange 18 located in the counterbore 14 and resting against the bottom thereof. Between both flanges 16 and 18, sleeve 15 is formed with a relatively large annular space or chamber 19. Mounted on the sleeve annular flange 18, there is a rubber packing ring 20, a follower 21 and a retainer 22, the latter being screwed in the outer end of the counterbore 14, thereby detachably securing sleeve 15 in chamber 13.

Slidably mounted through each sleeve 15, packing 20, follower 21 and partly into the retainer 22, there is a concentric cylindrical cup shaped piston or plunger 23 having its solid inner end normally flush with the inner end of the sleeve 15. Internally, plunger 23 is fitted on a coaxial push rod 24 which normally extends from the bottom of the plunger through the retainer 22 in fluidtight relation therewith by means of an adequate packing 25. Outside of the cylinder 10, the free end of the push rod 24 is rigidly secured by a screw threaded connection 26 to one of the side arms 27 of a substantially U-shaped saddle 28, the bottom of which extends alongside of the cylinder 10.

As clearly shown in Figure 1, the cylinder 10 is actually located between the side arms 27 of the saddle 28, which side arms are, on the center axis of the cylinder, connected to the push rods 24. The right side arm 27 in Figure 1, is somewhat larger than the other and is transversely apertured as at 29. Similarly enlarged and transversely apertured as at 30, is the end of bracket 11 rigidly secured to cylinder 10, which end is longitudinally spaced from the adjacent end of cylinder 10 to enable movement of the left side arm 27 therebetween. With respect to the entire unit, it may be said that the apertured side arm 27 of saddle 28 and the apertured end 30 of bracket 11, form the apertured terminals of the unit, which are located on its center axis and are adapted to be fastened to two objects or members whose relative movements are to be cushioned.

Leading from the exterior of the unit to admit air in the bottom end of each cup shaped plunger 23, there is a central port 31 extending through each stem 24, which port, except for a small by-pass 32, is normally closed by a spring pressed check valve 33.

The space between the adjacent ends of the sleeves 15, hereinafter referred to as the spring chamber 34, is capable of communication with the annular grooves or damping chambers 19 by means of ports 35 extending through the annular flanges 16. The ports of each flange are opened or closed by a ring valve 36 located in the spring chamber 34 and urged against the end of the sleeve 15 by compression springs 37 mounted between the ring valves 36. The diameters of the annular flanges 16 and ring valves 36 are substantially equal.

In the modification of the invention shown in Figure 5, there is provided a cylinder 100 formed with an apertured terminal 101. Internally it is provided with a cylindrical bore 102 having a reduced closed end 103. A sleeve 104 is mounted in the bore 102 and has a relatively small central bore 105 and on each side thereof relatively large annular chambers 106 and 107. Mounted in the bore 102 on each side of the sleeve 104 is a set of three washers 108, the middle washer of each set being made of packing material such as rubber. One set is resting against the bottom of the larger portion of the bore 102, while sleeve 104 is clamped between the two sets by a retainer 109 screwed in the threaded open end of the bore 102.

Slidably mounted in the sleeve bore 105 is the liquid spring piston 110 having a piston rod portion 111 extending therefrom through the retainer 109 and adjacent washers 108, where it is formed externally of the cylinder 100 with an apertured terminal 112. Another piston rod portion 113 extends from the left side of the piston in Figure 5, through the other set of washers 108 to end into the reduced bore or damping chamber 103, where it is provided with a damping piston 114 rigidly mounted thereon for slidable movement in the chamber 103. This damping piston has its peripheral edges beveled to reduce its contacting area with the inner wall of the damping chamber, which wall is substantially thinner than that of the cylinder 100.

Figure 6:
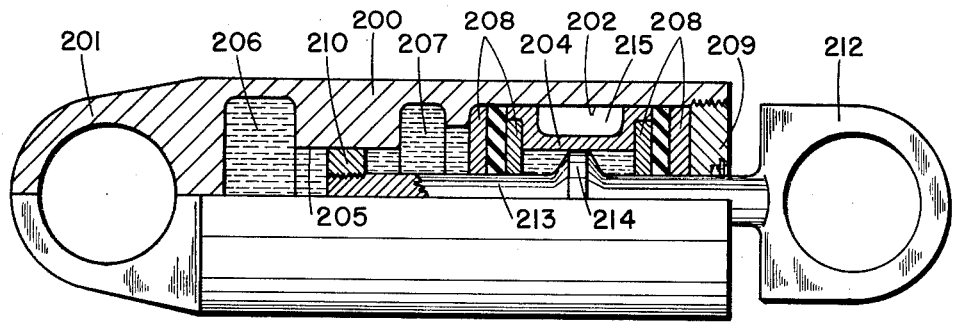

The modification shown in Figure 6 is substantially the same as that shown in Figure 5, except that the locations of the liquid spring and liquid damping sections have been reversed. In this construction the cylinder 200 has an apertured terminal 201 and a cylindrical bore 202 having mounted therein a sleeve 204 clamped between two sets of three washers 208 by a retainer 209. The inner end of cylinder bore 202 is reduced as at 205 and is provided on each side thereof with two relatively large annular spring chambers 206 and 207. Slidable in the reduced bore 205, there is a spring piston 210 mounted on the inner end of a piston rod 213, which rod extends through the two sets of washers 208 and retainer 209 and exteriorly of housing 200 is formed with an apertured terminal 212. Intermediate its ends, piston rod 213 is equipped with a damping piston 214 in slidable engagement with the wall of sleeve 204, which wall is made relatively thin by a deep external annular groove 215.

Figure 7:
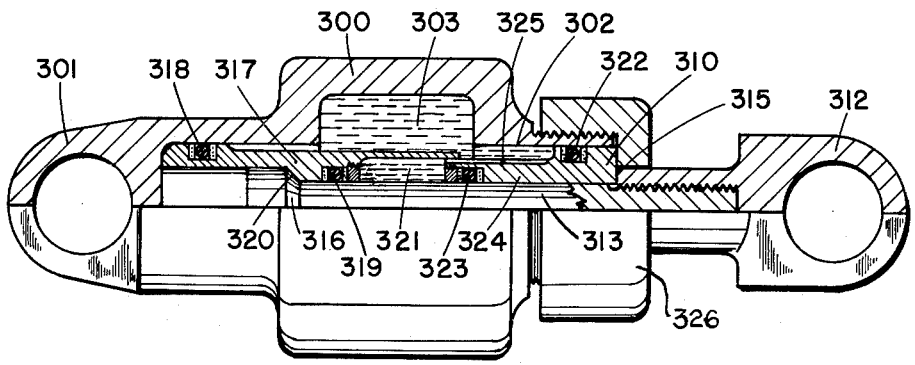

The modification shown in Figure 7 includes a cylinder 300 also formed with an apertured terminal 301 and a central flat bottom bore 302 formed intermediate its ends with an enlarged annular groove or damping chamber 303. Slidable in the cylinder 300, there is a piston rod 313 having an apertured terminal 312 screwed thereon and forming adjacent its outer end an external shoulder 315, while a similar shoulder 316 is formed on its inner end. A sleeve-like plunger 317 is slidable in the inner end of the bore 302, its fluidtight engagement with the wall thereof being assured by an external packing 318 and with the piston rod 313 by an internal packing 319. Between the two packings, plunger 317 is formed with an internal shoulder 320 engageable by shoulder 316 of piston rod 313 for imparting axial movement to the plunger in one direction. The outer end of the plunger 317 is formed with a relatively large counterbore or spring chamber 321, the wall of which is relatively thin.

Also slidable in the bore 302 there is a piston 310 mounted on the rod 313 and engageable by the shoulder 315 for axial movement therewith toward piston 317. A fluidtight joint of the piston 310 with the wall of the bore 302 is assured by an external packing 322 and with the rod 313 by an internal packing 323. Piston 310 has a cylindrical skirt 324 slidably engaging the wall of the chamber 321, externally this skirt is being provided with longitudinally extending smal grooves 325. The cylinder bore 302 is closed by a cap 326 secured on the cylinder, which cap also limits movement of the piston 310 in one direction.

In the operation of the unit shown in Figures 1 to 4 inclusive, the chambers 34 and 19 are first filled with liquid such as oil with the parts positioned as shown in Figure 1, that is under no-load condition. After the terminals 29, 30 have been connected to objects whose relative movements are to be cushioned, any such movement will cause axial movement of the saddle in either direction relative to the cylinder 10. Since the diametrically opposite ends of the saddle are rigidly connected to the push rods 24 extending inwardly therefrom, the rods will move with the saddle to push one of the pistons 23 into the chamber 34. Inward movement of the piston into the chamber will of course reduce its volumetric capacity, thereby causing the liquid stored therein to be compressed while checking inward movement of the piston in a spring like manner. Compression of the liquid in chamber 34 will build up a relatively high pressure, which will cause radial expansion of the cylinder wall surrounding the chamber, and create an annular orifice 40 between that wall of the annular flanges 16 of the sleeves 15 as clearly shown in Figure 3. The width or size of this annular orifice is a function of the pressure in the chamber 34, and consequently a function of the velocity of the piston 23 into the chamber 34. With the creation of this annular orifice, the energy stored in the chamber 34 as a result of the compression of the liquid therein, is now free to dissipate itself through the annular orifice 40 into the damping chambers 19 until the pressure is substantially equal in all chambers.

As the force which caused the inward movement of the piston 23 is removed, the compressed liquid in the spring chamber 34 will return the piston to its original position, that is, withdraw it from the chamber 34, causing the liquid in that chamber to be under lesser pressure than that in the chambers 19, thereby enabling the wall of the cylinder to retract to normal position and closing the annular orifice 40. Liquid under higher pressure in chamber 19 than in 34, acting through the ports 35, will shift the ring valves 36 away from the end faces of the annular flanges 16 for opening the ports 35, thereby enabling return of the liquid into chamber 34 until the pressure is again equalized.

Since the outward movement of the pistons 23 is limited by the retainers 22, it will be understood that when the saddle 28 is moved from its neutral position shown in Figure 1 in one or the other direction, one of the push rods 24 is pulled out of its respective piston 23, thereby creating a suction capable of unseating the check valve 33 for admitting air through the port 31 in the bottom of the temporarily stationary piston 23. As the saddle is returned to its neutral position, the check valve 33 seated by its compression spring, will close the end of port 31, and force the air trapped in the piston to escape therefrom through the small vent or by-pass 32, thereby producing a cushioning effect which assists in the smooth operation of the device and prevents hammering between push rods 24 and piston 23.

The operation of the device shown in Figure 5 is somewhat different from that of Figure 1, in that the liquid spring and liquid damping form separated sections. Assuming that all chambers 103, 106 and 107 are filled with liquid such as oil, and that the terminals 101 and 112 have been connected to objects whose relative movements are to be cushioned, it will be understood that pistons 110 and 114 will move in unison axially in one or the other direction by virtue of the relative movement of said objects. Axial movement of the piston 110 will compress the liquid in either chamber 106 or 107, thereby creating a spring action. Corresponding movement of the piston 114 in the relatively small chamber 103 will, even upon a relatively small movement of the piston, compress the liquid on one or the other side of the piston, thereby creating pressure in said chamber which will expand its wall and create an annular orifice around the piston 114 and permit equalization of liquid pressure on both sides of the piston.

The operation of the device shown in Figure 6 is substantially the same as that shown in Figure 5, except that the position of the liquid spring and liquid damping sections has been reversed. Relative movement of the terminals 201, 212 will compress the liquid in relatively large chamber 206 or 207, by movement of the piston 210 in one or the other direction, thereby producing a spring action similar to that resulting from movement of piston 110 in Figure 5. Corresponding movement of the piston 214 in the relatively small sleeve 204 will, even upon a relatively small movement of the piston, compress the liquid on one or the other side of the piston, thereby creating pressure in the sleeve 204 which will expand its wall and create an annular orifice around the piston 214 and permit transfer of the liquid from one side of the piston to the other.

In the operation of the device shown in Figure 7, relative movement of the terminals 301, 312 resulting from the movement of the objects to which they are connected, will cause axial movement of the piston rod 313 in either direction, and inward movement of piston 310 or 317 by compressing liquid stored in the relatively small chamber 321. Pressure thus created in chamber 321 will expand its relatively thin wall and form an annular orifice between it and the skirt 324 of piston 310, enabling the liquid to flow through that orifice into damping chamber 303 until the pressure in both chambers is substantially equal. Upon return of the pistons 310, 317 in their normal position, liquid from chamber 303 will flow slowly into chamber 321 through the longitudinal grooves 325 until the pressure is again normal in both chambers.

From the foregoing description, it will be understood that the invention consists of a shock and vibrator isolator of the liquid spring type, the performance of which is shown and described as being efficient in both directions. In this respect, it must be kept in mind that different performances or spring rates during compression and extension of the unit can readily be obtained by using pistons of different sizes or strokes.

The double acting liquid spring is equipped with a liquid damping controlling device in the form of a variable annular orifice provided by the resilient deflection, that is, deflection below the elastic limit of one of the members, resulting from the strain to which it is subjected. Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A liquid spring comprising a housing, a duality of liquid filled chambers in said housing normally closed from one another, load responsive means capable of compressing liquid in either of said chambers under pressure effecting resilient deflection of the wall of the pressurized chamber, and an orifice between said chambers created by virtue of said deflection to enable pressure equalization in said chambers.

2. In a device of the class described, relatively movable cylinder and piston elements, a duality of liquid filled chambers in said cylinder element normally closed from one another, the liquid in one of said chambers being adapted to check movement of said piston element and being compressed thereby under pressure effecting resilient deflection of the wall of said one chamber, and an orifice between said chambers created by virtue of said deflection to enable pressure equalization in said chambers.

3. A liquid spring comprising a housing, a duality of liquid filled cylindrical chambers in said housing, a relatively narrow partition between said chambers normally engaging the wall of one of said chambers, a piston slidable in said housing against liquid in said one chamber to compress same under pressure effecting expansion of said wall, and an annular orifice between said wall and partition formed by virtue of said expansion to enable pressure equalization in said chambers.

4. A shock absorbing device comprising a cylinder having a piston slidable therein, a duality of liquid filled chambers in said cylinder and a cylindrical wall common to both members, a partition between said chambers normally engaging said wall, the liquid in one of said chambers being compressible by said piston under variable pressure directly proportional to its velocity, said wall being expansible by virtue of said pressure, and liquid damping means between said chambers including a variable orifice between said wall and partition created by virtue of the expansion of said wall.

5. In a shock absorbing device, a cylinder having a duality of axially opposed plungers slidable therein, a duality of liquid filled chambers in said cylinder one between said plungers, an annular partition normally closing said chambers from one another, said plungers being capable of entering said one chamber to compress the liquid therein under pressure capable of resiliently expanding the wall of said cylinder away from the peripheral wall of said partition to create an annular orifice therebetween enabling pressure equalization between said chambers.

6. In a shock absorbing device according to claim 5, in which valve controlled means is provided for the return of the liquid into said one chamber upon withdrawal of said plungers therefrom.

7. In a shock absorbing device, a cylinder having a duality of axially opposed plungers slidable therein, rigid means limiting outward movement of said plungers, a first chamber in said cylinder filled with liquid adapted to check inward movement of said plungers, said liquid being compressed by pressure exerted thereon upon inward movement of either plunger, said pressure being capable of expanding the wall of said chamber, liquid damping means including a second liquid filled chamber in said cylinder, a partition between said chambers normally engaging the wall of said cylinder, means conveying liquid in one direction between said chambers created by the expanded wall of said chamber away from said partition, said wall being automatically retracted into normal position to close said conveying means upon pressure equalization in said chambers, and means conveying liquid in the other direction between said chambers upon withdrawal of pressure from said first chamber.

8. A double acting shock absorbing device comprising relatively movable cylinder and saddle elements, terminal means on said elements for connection of the device to two objects whose relative movements are to be cushioned, a duality of axially spaced plungers slidable in said cylinder, rigid means limiting outward movement of said plungers, push rods between said saddle element and plungers translating movement of the former in either direction into inward movement of one or the other of the latter, a first chamber in said cylinder filled with liquid checking inward movement of said plungers and compressed thereby under pressure directly proportional to the velocity of said inward movement, said pressure effecting resilient expansion of the wall of said cylinder, a second liquid filled chamber in said cylinder, a partition between said chambers normally engaging the wall of said cylinder, and an orifice between said wall and partition created by the expansion of said wall to enable pressure equalization in said chambers.

9. A double acting shock absorbing device comprising a cylinder and a saddle longitudinally movable relative thereto, said saddle being substantially U-shaped with said cylinder mounted between the side arms thereof, a pair of coaxial push rods carried by said saddle for movement therewith and extending from the side arms thereof inwardly into said cylinder through the ends thereof, pistons in said cylinder slidable on said push rods and engaged thereby for inward movement therewith, a first chamber in said cylinder filled with liquid checking inward movement of said pistons and compressed thereby under pressure effecting resilient expansion of the wall of said cylinder, and liquid damping means including a second liquid filled chamber in said cylinder, partitioning means normally closing said chambers from one another, and a path of communication between said chambers created by the expansion of said wall.

10. A double acting shock absorbing device, comprising a cylinder, a saddle member slidable relative to said cylinder, a duality of coaxial longitudinally spaced pistons slidable in said cylinder, rigid means limiting outward movement of said pistons, push rods between said member and pistons translating movement of the former in either direction into inward movement of one or the other of the latter, and liquid means checking the inward movement of said pistons and compressed thereby under pressure proportional to the velocity of said inward movement.

References Cited in the file of this patent

UNITED STATES PATENTS

| Number | Name | Date |
|---|---|---|
| 564,351 | Vaughan | July 21, 1896 |
| 1,052,681 | Mathiesen | Feb. 11, 1913 |
| 2,071,701 | Mejean | Feb. 23, 1937 |
| 2,083,661 | Olley | June 15, 1937 |
| 2,554,807 | Bingham | May 29, 1951 |
| 2,614,896 | Pierce | Oct. 21, 1952 |

FOREIGN PATENTS

| 641,527 | Great Britain | Aug. 16, 1950 |